(12) United States Patent
Pramidi et al.

(10) Patent No.: US 8,086,897 B2
(45) Date of Patent: Dec. 27, 2011

(54) MODEL DRIVEN DIAGNOSTICS SYSTEM AND METHODS THEREOF

(75) Inventors: Sailaja S Pramidi, Bangalore (IN); Tom Viviano, Dallas, TX (US); Swaminathan Natarajan, Navi-Mumbai (IN)

(73) Assignee: Infosys Limited, Bangalore (IN)

( * ) Notice: Subject to any disclaimer, the term of this patent is extended or adjusted under 35 U.S.C. 154(b) by 289 days.

(21) Appl. No.: 12/269,576

(22) Filed: Nov. 12, 2008

(65) Prior Publication Data

US 2009/0150724 A1    Jun. 11, 2009

(30) Foreign Application Priority Data

Nov. 15, 2007    (IN) .......................... 2663/CHE/2007

(51) Int. Cl.
*G06F 11/00* (2006.01)
(52) U.S. Cl. ........................ 714/6.11; 714/24
(58) Field of Classification Search ............... 714/6, 26, 714/6.11
See application file for complete search history.

(56) References Cited

U.S. PATENT DOCUMENTS

| | | | | |
|---|---|---|---|---|
| 5,483,637 A * | 1/1996 | Winokur et al. | .................. | 714/26 |
| 5,539,877 A * | 7/1996 | Winokur et al. | .................. | 714/26 |
| 5,544,308 A * | 8/1996 | Giordano et al. | ................ | 714/26 |
| 5,893,083 A * | 4/1999 | Eshghi et al. | .................... | 706/45 |
| 6,012,152 A * | 1/2000 | Douik et al. | ..................... | 714/26 |
| 6,226,760 B1 * | 5/2001 | Burkhardt et al. | ............... | 714/33 |
| 6,460,070 B1 * | 10/2002 | Turek et al. | ..................... | 709/202 |
| 6,845,474 B2 * | 1/2005 | Circenis et al. | .................. | 714/48 |
| 7,007,200 B2 * | 2/2006 | Salem | ............................. | 714/26 |
| 7,194,445 B2 * | 3/2007 | Chan et al. | ....................... | 706/20 |
| 7,260,743 B2 * | 8/2007 | Fellenstein et al. | .............. | 714/26 |
| 7,600,007 B1 * | 10/2009 | Lewis | ............................ | 709/223 |
| 7,802,144 B2 * | 9/2010 | Vinberg et al. | .................. | 714/37 |
| 2002/0144187 A1 * | 10/2002 | Morgan et al. | .................. | 714/43 |
| 2008/0059839 A1 * | 3/2008 | Hamilton et al. | ............... | 714/26 |
| 2008/0282104 A1 * | 11/2008 | Khan | ................................ | 714/2 |

* cited by examiner

*Primary Examiner* — Joshua Lohn
*Assistant Examiner* — Kamini Patel
(74) *Attorney, Agent, or Firm* — Klarquist Sparkman, LLP

(57) ABSTRACT

A method to perform a diagnostic test in an integrated support platform having a plurality of services is disclosed. The method includes a process of building at least one or more knowledge model for each of the plurality of services in the integrated support platform. The process of building the knowledge model includes determining one or more failure (s) of each component and at least one associated symptom to identify the one or more failures and constructing a framework for the diagnostic test associated to the one or more failures. The framework comprising the diagnostic test may be created by at least one of an execution plan based on the most efficient path for determining the failure. The method further includes performing the diagnostic test for resolving one or more failures of each component by using the framework based on the built knowledge model for the plurality of services.

28 Claims, 7 Drawing Sheets

MODEL DRIVEN DIAGNOSTICS SYSTEM AND METHODS THEREOF

TECHNICAL FIELD

The present invention relates to a diagnostics, and more particularly, to a method of resolving failures in a telecommunication domain by at least one of the customer support operation or network support operation or both through the diagnostics constructed dynamically using a model driven approach in an integrated support platform having a plurality of services.

BACKGROUND

A method of providing a customer support or a network support is well known in a telecommunication domain. The method typically includes utilizing a knowledge management for diagnosing trouble or problem in the customer support and a network management system for diagnosing problem in the network support. The usage of the knowledge model for diagnosing the customer problem may be done either by a customer support representative (CSR) or by an agent or technicians. Similarly, the usage of the network management system for diagnosing the network problem may be done either by the agent or the technicians. Predominantly, the method includes an analysis the technicians performs in trouble diagnosis and propagating at least one or more diagnosis test results or solutions either through a CSR to the customer or through the network monitoring group to the network. The use of the proven solutions for resolving the trouble either faced by the customer or in the network uses some sophisticated techniques by the technicians. The techniques may include at least one of a CASE based reasoning or Bayesian networks or Rule based correlation or reasoning or combinations thereof.

However, the method used to resolve trouble faced either by the customer or in the network requires particular expertise of the agents and may even take a lot of time to isolate. If the problem is not apparent from the outset, the technicians may narrow down the problem space by a process of elimination by running the various diagnosis tests, which may again consume lot of time and money to resolve the problem. Also, the techniques used in the conventional methods require lot of expertise of the technicians and hence involves people dependencies in resolving the problem.

Often, the techniques used by the agents or technicians either in the customer support or in the network support for resolving the problem are disparate. Moreover, the network support and the customer support does not share any knowledge, though at times both needs to solve the same kind of problem expressed in different ways, which makes the process of resolving the problem a very inflexible and context neutral.

The conventional method includes capturing a best practice(s) of troubleshooting by a most experienced engineer(s) during initial phases of the service/product rollout and refining the best practices by a Level 1 operations staff in further phases. Thus, the conventional process may have higher lead time for the customer support operations or the network support operations to be ready for the service support on the new service.

Thus, there is a need for a method for a knowledge model, which may be used easily to resolve the customer problems in a timely and cost effective manner and to improve the readiness of the customer support operations, for a new service.

SUMMARY OF THE INVENTION

In one embodiment of the present invention, a thorough method using a model driven approach for a problem isolation and diagnosis in a network support operation and a customer support operation in an integrated support platform is detailed. The integrated support platform uses a knowledge model built by experts in a domain or an information model for enriching the context of a ticket raised by the problem or both to operate quickly in problem isolation and resolution. In another embodiment of the present technique, the approach works on the paradigm of domain specific modeling and leveraging the domain models of products or services or resources or combinations and the ability to use one or more information about failures to derive diagnostics.

In one embodiment of the present technique, the method of performing a diagnostics in an integrated support platform having a plurality of services is detailed. The method comprises building at least one or more knowledge model for each of the plurality of services in the integrated support platform. Each of the knowledge models comprises at least one or more components related to the plurality of services. The method comprising building at least one knowledge model further includes determining one or more failure(s) of each component and at least one associated symptoms to identify the one or more failures and constructing a framework for the diagnostics associated to the one or more failures. The diagnostics may be constructed using at least one of an execution plan created based on the most efficient path for determining the failure. The method further comprises performing the diagnostics for resolving one or more failures of each component by using the framework based on the built knowledge model for the plurality of services.

In another embodiment of the present technique, the method further comprises an information model for enhancing the context of a ticket for the problem escalated from at least one of the customer or the network management platform or combinations thereof. The information model for enhancing the context of the ticket includes information gathered from a plurality of application source comprising at least one of a Customer Relationship Management (CRM) or a network inventory or a engineering application or a fault management or a performance management or a Service Level Agreement (SLA) management or a trouble management or combinations thereof.

In yet another embodiment of the present technique, the approach may help a Communication Service Provider (herein also referred as "CSP") to build the knowledge model before the service or product or both being rolled and make the Customer Support Representative ("herein also referred as "CSR") to readily solve the problem in much faster and effective way. In another embodiment of the present technique, the knowledge model built by the experts may generate the diagnostic plan dynamically for resolving the problem by considering the symptoms or a costs or a planned engineering maintenance work or a network migration details or an early service failure about a new service rolled in the market or a network alarms or a performance thresholds or a trouble history results or combinations thereof.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to a method of performing a diagnostics in an integrated support platform having multiple services. Also, the method further includes providing the diagnostics for a plurality of products for each of the plurality of services.

The following description is presented to enable a person of ordinary skill in the art to make and use the invention and is provided in the context of the requirement for obtaining a patent. The description is the presently best contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Figure 1:
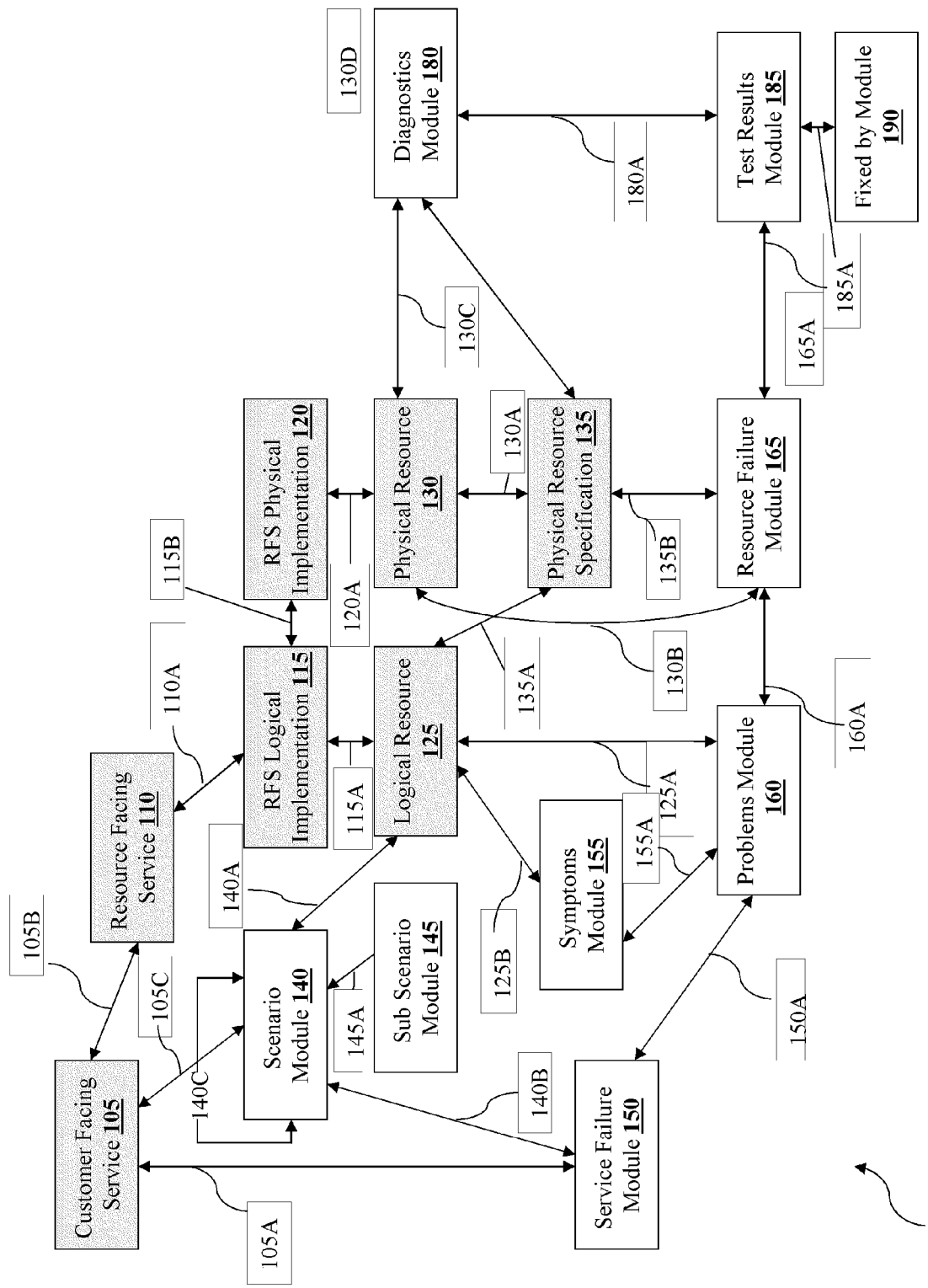
FIG. 1 is a block diagram of a system illustrating a knowledge model showing a number of modules configured for building a knowledge model to perform a diagnostics in an integrated support platform, according to one possible embodiment of the present technique.

Referring to the figures, FIG. 1 is a block diagram of a system 100 depicting a knowledge model for performing a diagnostics in an integrated support platform having multiple services. The system 100 comprises a multiple number of modules useful to perform the diagnostics quickly and also allows a Communication Service Provider (herein also referred as "CSP") to roll new service quickly without any time lag. The system 100 comprises several modules employed from TM Forum and few other modules devised as per the present technique for performing a diagnostics in an integrated support platform having multiple services. The modules employed from the TM Forum includes at least one of a customer facing service 105 or a resource facing service 110 or a logical resource 125 or a physical resource 130 or a physical resource specification 135 or combinations thereof. The modules devised as per the present technique includes at least one of a scenario module 140 or a sub scenario module 145 or a service failure module 150 or a symptoms module 155 or a problem module 160 or a resource failure module 165 or an attribute module 170 or a identifying attribute value module 175 or a diagnostic module 180 or a test results module 185 or a fixed by module 195 or combinations thereof. The functionality of each module as devised in the present technique in relation with the modules as employed from the TM Forum will be detailed largely in the subsequent sections to follow. However, the modules employed from the TM-Forum may comprise more modules, which are omitted or simplified in order not to obscure the illustrative embodiments. The scope of the system 100 should not be limited in light of the present technique.

In one embodiment of the present technique, the customer facing service 105 includes at least one of service(s) or product(s) information used by each customer. The resource facing service 110 includes information of all of the components employed for each services or products. The resource facing service 110 may further include details of the RFS logical implementation 115 or the RFS physical implementation 120 of each component associated to the respective service or product. The RFS logical implementation 115 may have the details of all logical resource 125 related to the respective service or product. Similarly, the RFS physical implementation 120 may have the details of all physical resource 130 related to the respective service or product. The physical resource specification 135 may include information about all physical resource components which are implemented as per RFS physical implementation 120 in the resource facing service 110.

The customer facing service 105 may interact with the resource facing service as represented by reference numeral 105B, to exchange information between a customer service operation and a network service operation. The resource facing service 110 may communicate with the RFS logical implementation 115, as represented by reference numeral 110A, to obtain the implementation details of a logical component(s) used in respective service or product. The RFS logical implementation 115 may further derive the RFS physical implementation 120 implementation details of all physical components associated with the logical component associated to the respective service or product, as represented by reference numeral 115B. The RFS logical implementation 115 may once again interact with the logical resource 125 to know all logical components used to implement the respective service or product, as represented by reference numeral 115A. Similarly, the RFS physical resource 130 may interact with the physical resource 130 to know all physical components associated to logical components to implement the respective service or product, as represented by reference numeral 120A. The specification of the physical components may be derived from the physical resource specification 135 either to the logical resource 125 as represented by reference numeral 135A or to the physical resource 130 as represented by reference numeral 130A.

In one embodiment of the present technique, the building the knowledge module comprising various modules as devised in the present technique in relation with the modules as employed from the TM Forum may capture knowledge/information from a expert in the domain, respective to the service or the product. The scenario module 140 may be used to capture all possible variation in service or product utilization, which the customer facing service 105 may experience while using the respective service or the product. The scenario module 140 may depend on the services or product features used by the customer as presented in the customer facing service 105, as represented by reference numeral 105C. The possible scenarios listed by the experts in the domain may once depend on the scenario earlier described in the scenario module 140, as represented by reference numeral 140C. The scenario module may also include a sub scenario module 145. The sub scenario module 145 may comprise the possible sub scenario associated or derived out of the scenarios detailed in the scenario module 140, as represented by reference numeral 145A. The scenario module 140 may further relate with the logical resource 125 to determine the respective logical component and the associated physical component specification involved in the customer facing service 105, as represented by reference numeral 140A, 135A.

The service failure module 150 may comprise list of all possible service failures determined by the expert in the domain, the customer may face while using the respective service or product. The customer facing service 105 is thus related to the service failure module 150, as represented by reference numeral 105A to determine at least one or more possible service failure from the list of service failure information determined by the expert. Also, the scenario module 145 may be linked to the service failure module 150 to determine the respective service failure associated with the scenarios, as represented by reference numeral 140B.

The symptoms module 155 may comprise list of all possible symptoms determined from the expert in the domain to determine at least one or more failure occurred either occurred in the customer facing services 105 or the resource facing services 110 for the plurality of services or products rolled from the CSP. The symptoms determined in the symptoms module may even be derived from the logical components listed in the logical resource 125.

The problem module 160 may comprise at least one or more information about the problem derived from the expert based on the associated symptoms, as represented by reference numeral 155A or from the logical resource 125 as represented by reference numeral 125A. The list of problems determined based on the associated symptoms or logical resource 125 may lead the expert in the domain to draw a relation with the service failure as listed in the service failure module 150.

The problem module 160 may even comprise the possible resource failure information determined by the experts based on the symptoms as listed in the symptoms listed in the symptoms module 155, as represented by reference numeral 160A.

The resource module 165 may comprise all possible resource failure associated with the service or product. The failure information may include at least one of a logical component failure or a physical component failure. The physical failure is determined based on the specification of the resource obtained from the physical resource specification module 135, as represented by reference numeral 135B and also from the physical component listed in the physical resource 130 as represented by reference numeral 130B. The logical failure information is determined through physical resource specification 135, which is in turn related to the logical resource 125.

The attribute module 170 may comprise the attribute of all resource component determined from the physical resource specification 135, as represented in reference numeral 135C. It may help to determine the attribute of the logical and physical component before detecting the diagnostics to isolate and resolve the service or resource failure. The identifying attributes value module 175 may include the values of the attribute determined from the physical resource 130, as represented by reference numeral 130D. The identifying attributes value module may also assist in determining the status of the physical component before detecting the diagnostics to isolate and resolve the service or resource failure.

The diagnostic module 180 includes the list of all possible diagnostics determined by the expert in the domain to resolve the resource failure or the service failure of either the physical component or the logical component. The diagnostics are determined by the experts in the domain taking into consideration the relationships of the physical components or both. The diagnostics may be augmented in the diagnostic module 180 based on a process of continuous learning.

The test results module 185 may include the best possible test which may be used to resolve the failure. The results stored in the test module 185 are optimally arranged based on the attributes or attributes value or through the process of continuous learning. The test results module may also comprise information derived from the resource failure module 165, as represented by reference numeral 165A.

The fixed by module 190 may comprise list of all possible customer support representative (herein referred as "CSR") details and the appropriate diagnostics in a sequential order used to isolate and resolve the failure, as represented by reference numeral 185A. In one embodiment of the present technique, the scope of the system 100 should not be limited in light of the functionality of the module detailed in the present technique. The scope of using the knowledge model as detailed in the above section will be explained thoroughly in FIG. 6.

Figure 2:
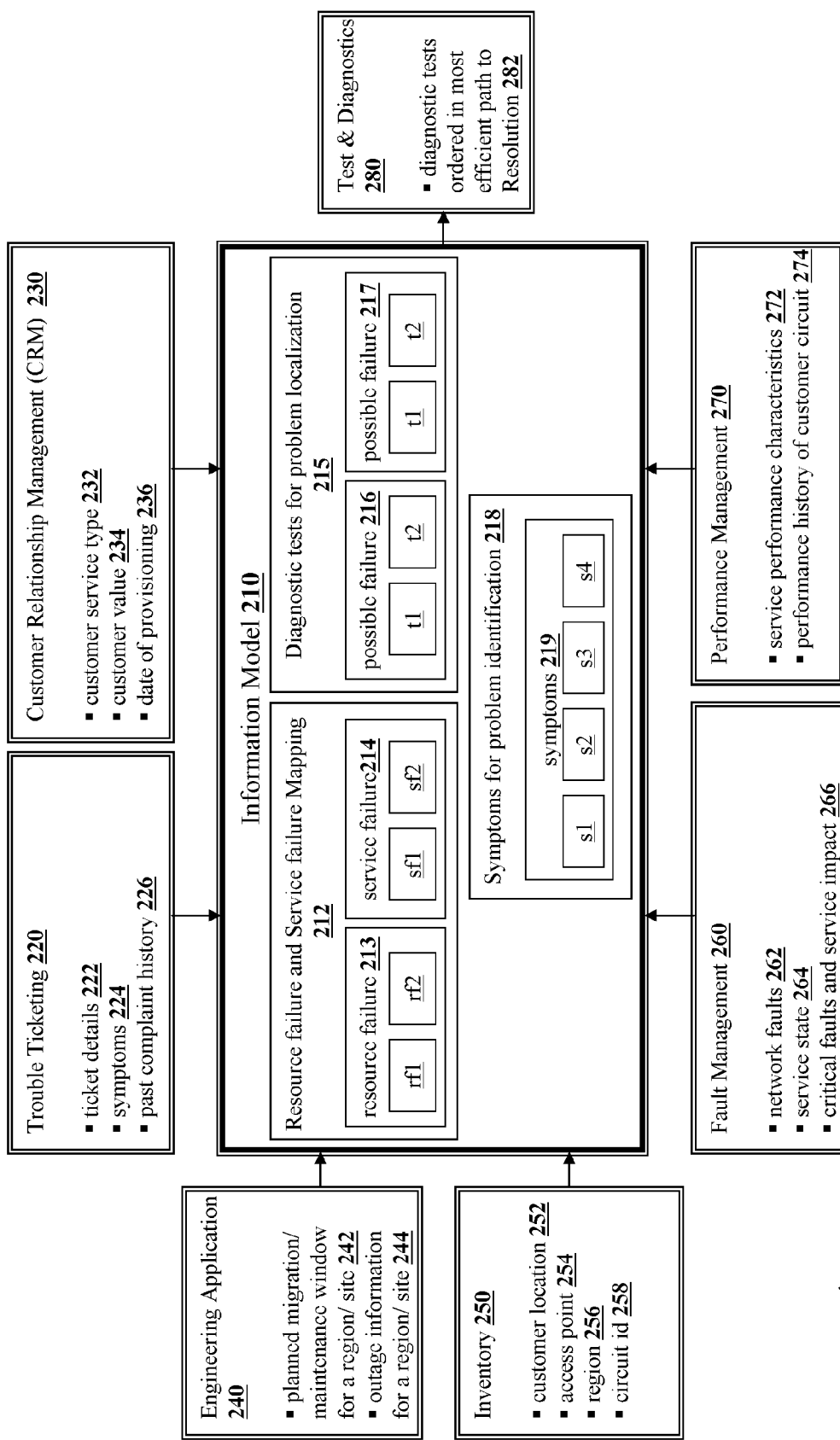
FIG. 2 is a block diagram of a system illustrating an information model illustrating the number of components configured for enhancing the context of a ticket for the problem escalated from at least one of the customer or a network support platform, according to one embodiment of the present technique.

Referring to the figures, FIG. 2 is a block diagram the system 200 illustrating an information model 210 illustrating the number of components configured for enhancing the context of a ticket for the problem escalated from at least one of the customer or a network support platform. According to one embodiment of the present technique, the information model 210 may use several application sources to enhance the context of the ticket either raised from the customer support platform or the network support platform. The application sources may include at least one of trouble ticketing 220 or a customer relationship management (herein referred as "CRM") 230 or an engineering application or an inventory or a fault management or a performance management or combinations thereof. The information model further comprises a test & diagnostics module 280.

In one embodiment of the present technique, the information model may comprise at least one of a resource failure and service failure mapping module 212 or a diagnostics for problem localization module 215 or a symptom(s) for problem identification module 218 or combinations thereof. Each of the modules detailed with in the information model may comprise sub module to identify the correct problem based on the symptoms and then to localize the problem and later determine the appropriate diagnostics to resolve the problem.

The resource failure and service failure mapping module 212 may comprise a resource failure sub module 213 and a service failure sub module 214. The resource failure sub module may include all resource failure information appropriate for the respective service or product as determined by the expert in the domain. The resource failure may be rf1 or rf2 or combinations thereof. Similarly the service failure sub module may include all service failure information appropriate for the respective service or product as determined by the expert in the domain. The service failure may be sf1 or sf2 or combinations thereof.

The diagnostics for problem isolation module 215 may include a list of possible failure sub module 216 or 217 or combinations thereof. Each of the possible failure sub module 216 or 217 may include list of tests t1 or t2, which may be used to localize the failure.

The symptoms for problem identification module 218 may include a symptoms sub module 219. The symptoms sub module 219 may comprise list of symptoms s1 or s2 or s3 or s4 or combinations thereof used to determine the appropriate service or resource failure.

In one embodiment of the present technique, the trouble ticketing 220 may include a ticket details 222 or a symptoms 224 or a past complaint history 226. The information included in the trouble ticketing 220 may be specific to each of the customer. The ticket details 222 may help the CSR to know the customer profile including SLA details and etc. The symptoms 224 may help the CSR to narrow down the customer problem either to the specific resource or the network failure. Similarly, the past complaint history 226 associated in the trouble ticket helps the CSR to determine whether the customer is reporting the same problem, which the customer might have reported earlier and the associated diagnostics used to resolve the customer problem. The information obtained from the trouble ticket may also imply to the ticket raised from the network support platform and the network support representative may use the same procedure to resolve the network problem.

In one embodiment of the present technique, the CRM 230 application may include at least one of a customer service type 232 or a customer value 234 or a date of provisioning 236 or combination thereof. The customer service type 232 may provide information about the customer profile wherein the customer value 234 may provide the importance level of the customer profile as per the SLA signed with the CSP. The date of provisioning 236 may provide the information related to the service or product is activated.

In one embodiment of the present technique, the engineering application 240 may provide information about a planned migration/maintenance window for a region or a site 242 or outage information for a region 244 or both. The planned migration/maintenance window for a region or a site 242 or outage information for a region 244 may be useful to determine the customer or network failure reporting details before hand itself and thus act accordingly in resolving the failures.

The inventory 250 may provide information about a customer location 252 or an access point 254 or a region 256 or a circuit id 258 or combinations thereof. The information may be useful to derive at the specific diagnostics. As the diagnostics may differ from the customer location 252 or from the region 256 or from combination thereof.

The fault management 260 may include a network details including at least one of a network fault(s) 262 or a service state 264 or a critical faults and service impact 266 or combinations thereof. The details determined may be useful to network support operation to take appropriate steps in resolving the failures.

The performance management 270 may include a service performance characteristic(s) 272 or a performance history of customer circuit 274 or combinations thereof. The information about the performance history of customer circuit determines whether there is any issue in the customer circuit in the past or else the performance of the services installed at the customer end.

In one embodiment of the present technique, the integrated support platform may include at least one of a customer support platform or a network support platform or combinations thereof. However, there may be few other platforms, which are omitted or simplified in order not to obscure the illustrative embodiments. The scope of the system 100 should not be limited in light of the present technique.

In one embodiment of the present technique, the customer support platform may include at least one of a trouble ticketing or a self care or a help desk or a Customer Relationship Management (CRM) or combinations thereof. The network support platform may include at least one of a network monitoring or an alarm collection and correlation or a network trouble reporting or a network performance monitoring or combinations thereof. The plurality of services may include at least one of a Digital Subscriber Line (DSL) service or a broadband service or an Internet Protocol (IP) TV service or a Voice over IP (VoIP) service or a wireless service or a cable service or an Internet Protocol (IP) Multimedia Subsystem (IMS) or combinations thereof.

The information model uses all the information to enhance the context of the ticket before isolating the problem either reported from the customer or the network. Once the failures gets isolated using the diagnostics for problem localization module 215, the test and diagnostic module 280 is used to determine the one of an execution plan based on the most efficient path for determining the failure. In one embodiment of the present technique, the scope of the system 200 should not be limited in light of the functionality of the model detailed in the present technique.

Figure 3:
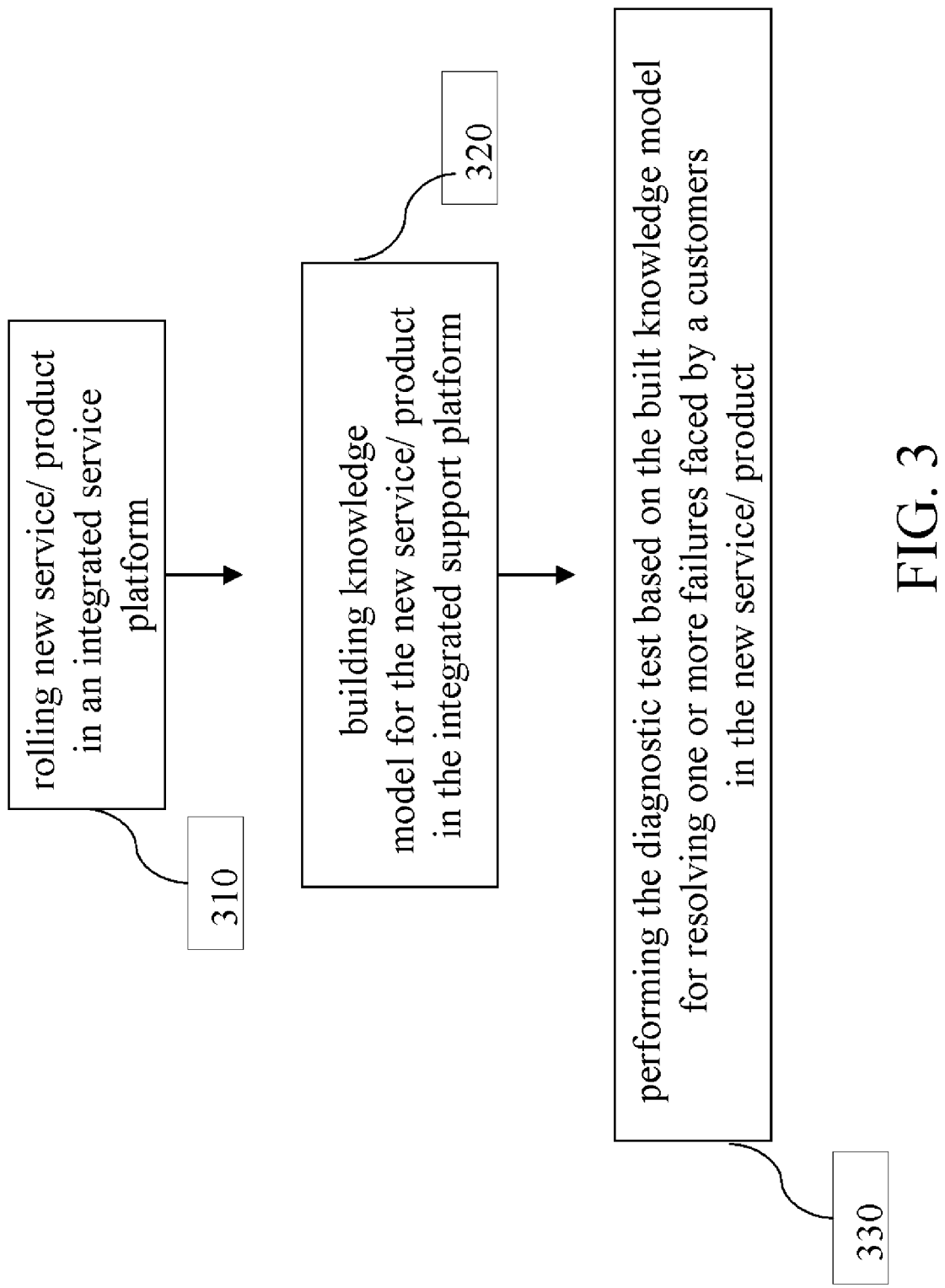
FIG. 3 is a flow diagram illustrating a method for performing a diagnostics in an integrated support platform, according to one embodiment of the present technique.

FIG. 3 represents a flow diagram illustrating a method for performing a diagnostics in an integrated support platform, in one embodiment of the present technique. The method comprising: 1) rolling a new service/product in an integrated support platform (block 301), 2) building knowledge model for the new service/product in the integrated support platform (block 302), and 3) performing the diagnostics based on the built knowledge model for resolving one or more failures faced by a customers in the new service/product (block 303). Each of the steps will be explained in greater extent in the subsequent sections as follows.

In step 301, the CSP may roll a new service/product in an integrated service platform. To handle customer support operation and the network support operation when the new service or product is rolled, the knowledge model is to be built as represented in step 320. Thereafter, the customer support platform or the network support platform uses the knowledge model to isolate and resolve the failures escalated either from the customer or the network in the form of the ticket as represented in step 330. The information model is also used to enhance the context of the ticket.

Figure 4:
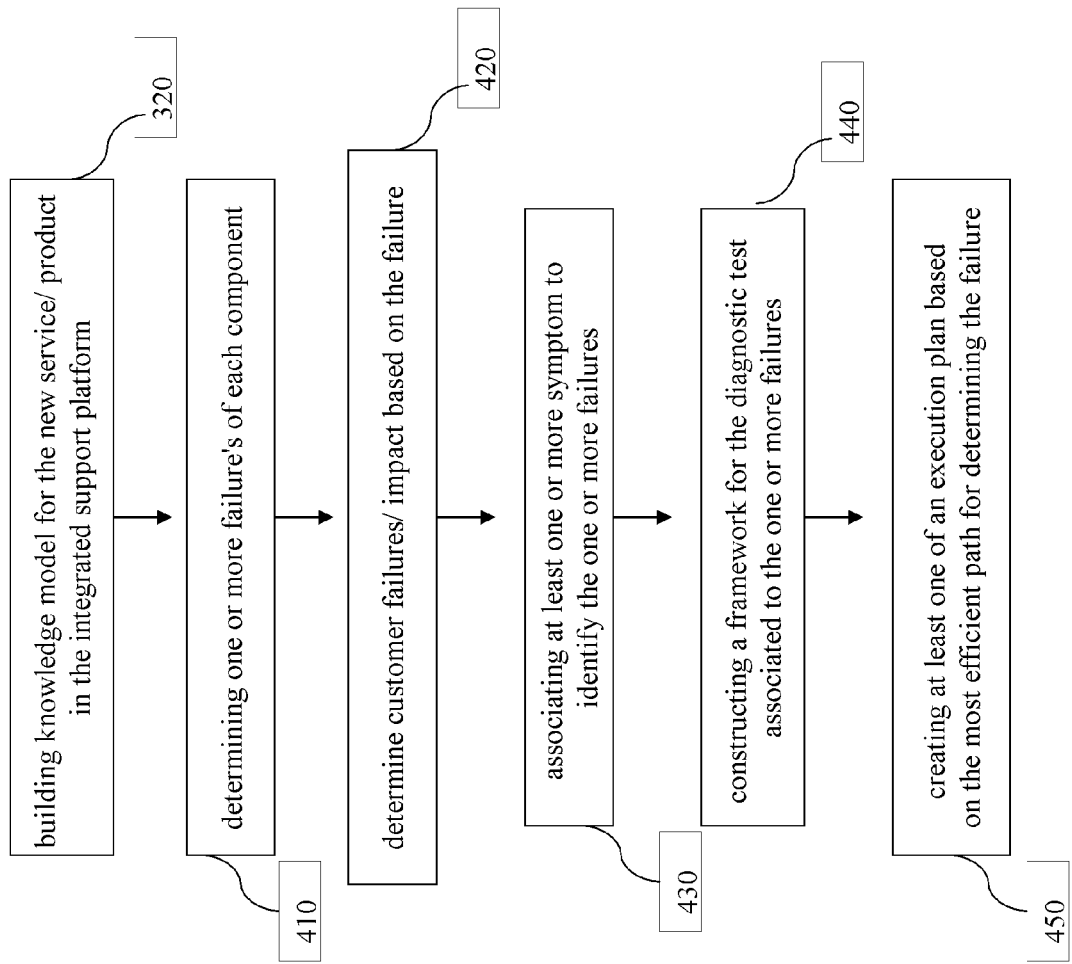
FIG. 4 is a flow diagram illustrating a method of building a knowledge model for performing a diagnostics in an integrated support platform, according to one embodiment of the present technique.

FIG. 4 represents a flow diagram illustrating a method of building a knowledge model for performing a diagnostics in an integrated support platform, according to one embodiment of the present technique. The method comprising: 1) building knowledge model for the new service/product in the integrated support platform (block 310), 2) determining one or more failure's of each component (block 410), 3) determine customer failures/impact based on the failure (block 420), 4) associating at least one or more symptom to identify the one or more failures (block 430), 5) constructing a framework for the diagnostics associated to the one or more failures (block 440), and 6) creating at least one of an execution plan based on the most efficient path for determining the failure (block 450). Each of the steps will be explained in greater extent in the subsequent sections as follows.

In step 320, the process of building the knowledge for the new service or product in the integrated support platform is initiated. The process of building the knowledge model includes determining all logical components and the associated physical components for the respective new service or product. Followed by implementation details of the logical components and the physical components for the new service or product. The process further includes determining a customer facing services and a resource facing service for the new service or the product.

In step 410, the plurality of possible failure of the logical component and the associated failures of the physical component are captured from plurality of experts in the domain. In step 420, based on the each determined failures, the experts in the domain captures at least one or more possible problem the customer or the network may face. In step 430, the problem the customer or the network faced is associated with at least one or more symptoms' to determine or identity the failures. Once the failures of each component are determined and the symptoms to identify the respective failures are mapped a framework for a diagnostics associated to localize the failures is constructed, in step 440. Based on the constructed framework of diagnostics at least one of an execution plan based on the most efficient path for determining the failure is created, in step 450. The execution plan may include at least one of a trouble shooting workflow or a customer symptom validation or a resource state validation or combinations thereof.

Figure 5:
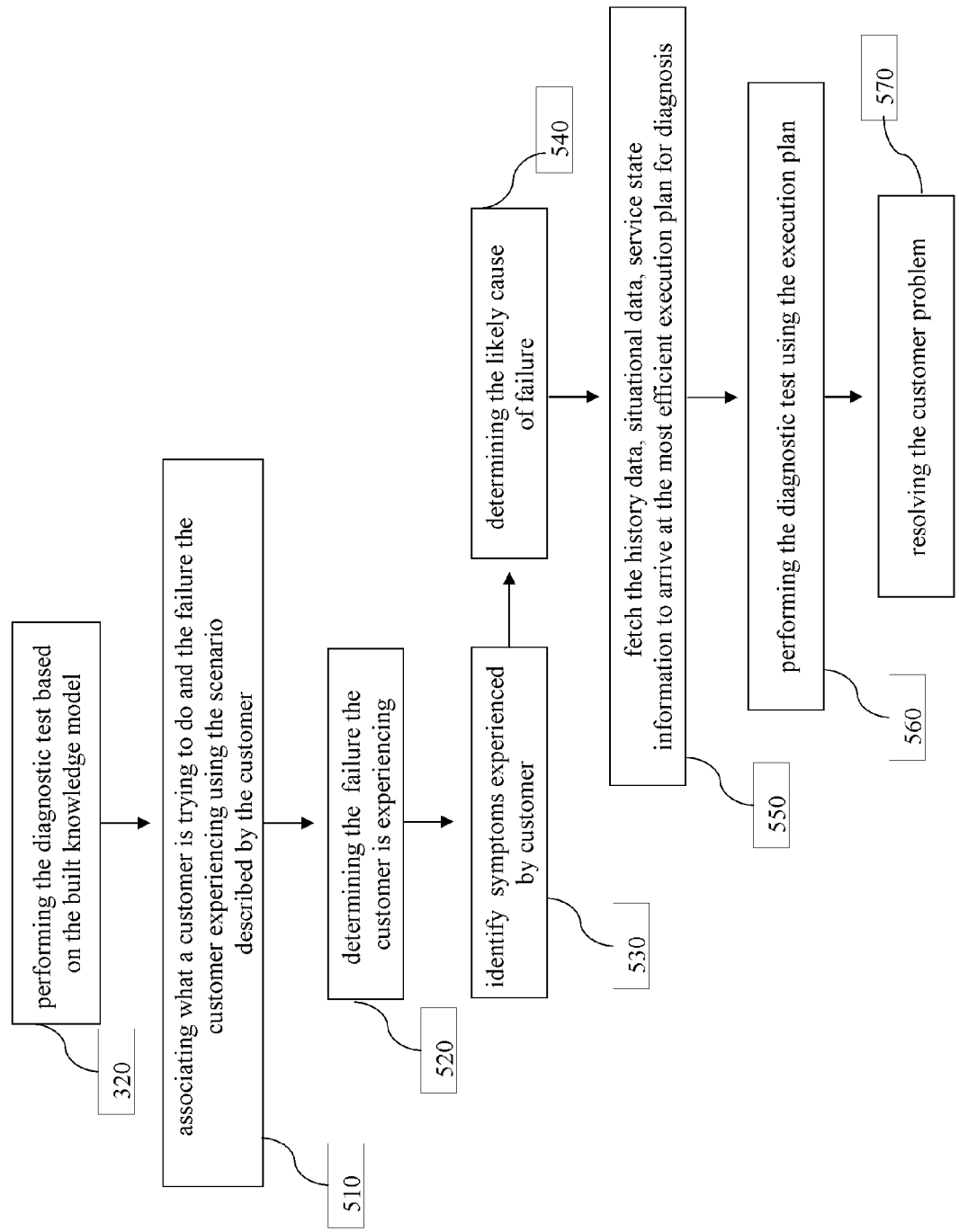
FIG. 5 is a flow diagram illustrating a method of performing a diagnostics in an integrated support platform using the built knowledge model, according to one embodiment of the present technique.

FIG. 5 represents a flow diagram illustrating a method of performing a diagnostics in an integrated support platform, according to one embodiment of the present technique. The method comprising: 1) performing the diagnostics based on the built knowledge model (block 330), 2) associating what a customer is trying to do and the failure the customer experiencing using the scenario described by the customer (block 510), 3) determining the failure the customer is experiencing (block 520), 4) identify symptoms experienced by customer (block 530), 5) determining the likely cause of failure (block 540), 6) fetch the history data, situational data, service state information to arrive at the most efficient execution plan for diagnosis (block 550), 7) performing the diagnostics using the execution plan (block 560), and 8) resolving the customer problem (block 570). Each of the steps will be explained in greater extent in the subsequent sections as follows.

In step 330, the built knowledge model may be used to perform the diagnostics to resolve the failures. The process of performing the diagnostics for resolving the failures either reported by the customer or in the network includes the step of associating the failure experienced in the form of the scenario described by the customer, step 510.

In step 520, the failure the customer or network is facing is determined. The failures may include at least one of a resource failure(s) or a service failure(s) or combinations thereof. The process of identifying the failures is based on a scenario describing a specific service feature used by the customer. The resource failure from a network is correlated to the service failures of the customer.

In step 530, the process of identifying the symptoms either experienced by customer or the network may be determined. The symptoms may be effective to localize the problem the customer or the network faced due to some failure in the logical component or physical component rolled in the service or product.

In step 540, the process of determining the likely cause of failure may be conducted by correlating the service failures and the resource failures sensed from the customer in form of the plurality of symptoms.

In step 550, the process of fetching the history results, situational data, and service state information to arrive at the most efficient execution plan for diagnostics is done. The process of fetching the history results may help in determining the most efficient path for determining one or more failures including at least one of a route defined from the expert (s) in the domain or through a process of continuous learning or combinations thereof. The process of continuous learning may include at least one of knowledge captured about failures from the experts in the domain or from the experience of resolving the similar problems by a customer support representative (CSR) or from a prior use of similar diagnostics test by the CSR in resolving the problem or combinations thereof. Also, determining situational information of the network including at least one of a planned engineering maintenance work or a network migration or an early service failure about a new service rolled in the market or combinations thereof. The planned engineering maintenance work or the network migration provides the CSR or the Network Support Representative (NSR) the appropriate action to take to resolve the failure. The process of continuous learning may further includes determining at least one of a cost of performing the diagnostics or an impact of the diagnostics on the network or a need for the diagnostics to interact with a manual process or an access privilege for performing the diagnostics or combinations thereof.

The process in step 550 may further include computing a historical result for a specific problem and associated diagnostics and resolution at periodic intervals to determine the appropriate diagnostics most used for resolving the failures sensed from the customer. The historical results may help in identifying and prioritizing one or more diagnostics for resolving the failures sensed from the customer, based on a resolution index assigned for each diagnostics. Each diagnostics may have the resolution index and the resolution may be incremented whenever the diagnostics is used to resolve the failure. In one embodiment, as per one exemplary example for service domain DSL broadband, the problem type may be no internet connection due to sync issues. If there are 4 execution plan as per the diagnostics which are ordered sequentially, the historical result analysis may show the step 3/test 3 "DSLAM profile test" has the high resolution index, then the execution plan test 3 with in the diagnostics having the highest resolution index may be used to resolve the problem.

Also, an information model may be used to enhance the context of a ticket for the problem escalated from at least one of the customer or the network support platform or combinations thereof. The information model may enhance the context of the ticket in by gathering information from a plurality of application source. The application source may include at least one of a Customer Relationship Management (CRM) or a network inventory or an engineering application or a fault management or a performance management or a Service Level Agreement (SLA) management or a trouble management or combinations thereof.

The process of determining the most efficient further may further include determining a state of at least one of the products or the services or both. The state of the system may be determined based on the condition of at least one device, which may include whether the physical component is in ON mode or in OFF mode or both. In one embodiment of the present technique, the diagnostics built using the knowledge model for the plurality of problems sensed from the customer are arranged optimally for resolving the failures.

In step 560, diagnostics are performed using the execution plan determined and arranged optimally in the knowledge model. The knowledge model may be used for conducting diagnostics for failures originated from at least one of the customer or a network monitoring or both.

In step 570, the model driven approach may resolve the problem either the customer or the network might have faced by using the execution plan arranged optimally in the knowledge model. The method of performing the diagnostics is detailed out in the exemplary example to be illustrated below. The exemplary example illustrated below should not be restrictive, in light of the present technique.

Figure 6:
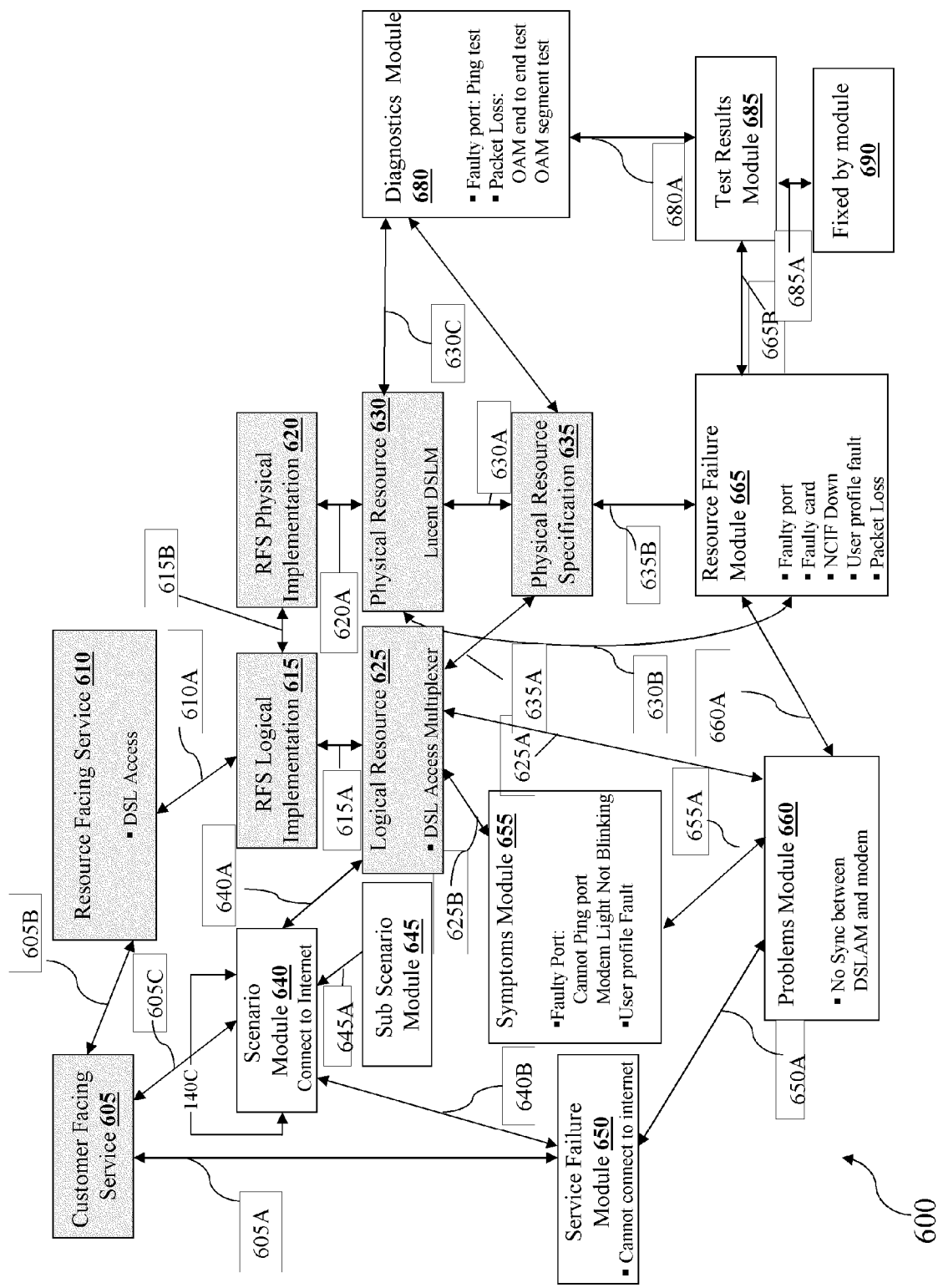
FIG. 6 is a block diagram of an exemplary example illustrating an approach of performing a diagnostics in an integrated support platform using the built knowledge model, according to one embodiment of the present technique.

FIG. 6 is a block diagram of an exemplary example illustrating an approach of performing a diagnostics in an integrated support platform using the built knowledge model, according to one embodiment of the present technique.

The exemplary example as per one embodiment of the invention is explained in two steps. The first step being creation of a DSL knowledge model and the second being a usage of DSL knowledge model.

In one embodiment of the present technique, the creation of the DSL knowledge model may include several phases. The phases comprise a process of representing the network architecture and T&D systems associated with a DSL service and process of representing all network element failures and associated tests and resultant fix resolution. The phases further comprise listing the various classes and attributes in the model to populate data from the expert in the domain. The order of population of various entities defined in knowledge model 600 towards creation of DSL Broadband service models includes a logical resources at atomic level being "DSL Access Multiplexer VDSL card, OC-3 trunk" as represented in block 625. The Scenario Developer would later populate the properties (capabilities) that the logical component has and the properties may be common across device manufacturers. The logical components built in the first stage could be used across domains. For e.g. representing a Fujitsu DSLAM or Alcatel DSLAM; create a single logical device DSLAM. This could be used when creating DSL architecture & or IPTV architecture. The logical resource at composite level may be "DSLAM=(Patch panel+xDSL Card+Trunk ports+Gigabit Ethernet Cables", as represented in block 625. The Physical Device may be "Lucent DSLAM" as represented in block 630, the logical Connection being the Ethernet wherein the Physical Connection is "RJ-45". The resource Failure is later determined with the help of a scenario, which may be failures on the DSLAM/Lucent DSLAM includes Faulty Port, Faulty Line card, User Profile Fault, NCIF down on DSLAM, Stale session, Packet loss. The symptoms that would indicate this failure may be DSL light blinking on a modem would indicate there could be a probable failure in jumpering. The service failure that may occur needs to be associated with the problem resource failure e.g. the service failure called "Can not connect to Internet" occurs due to Problem: No Sync if there is a jumpering failure. (Resource Failure). The diagnostics that need to be done to ascertain this Service/Resource failure need to be captured. E.g. A xDSL Copper Test or a TAM test would indicate a probable jumpering fault. Finally the resolution may be to assign an engineer to fix the jumpering.

In one embodiment of the present technique, the usage of the DSL knowledge model may once again include several phases. First phase may be the scenario of a user trying to connect to the internet with ADSL, as represented in reference numeral 640. When connecting to the internet, the customer may experience the service failure that the modem does not sync, as represented in step 650. The leading symptom to indicate that the modem is not achieving sync may be that the SYNC light on the modem would be blinking, as represented in step 655. If the modem was in sync, the SYNC status would be glowing with a steady green light. There may be a number of reasons/Resource Failures that could cause a No Sync issue; some of them are may include improper cabling at customer premises or faulty splitter or a fault in wall jack or a fault in line between customer premises and exchange or a jumpering fault or a fault in the exchange or a fault in the DSLAM port assigned to Customer or combinations there of, as represented in block 665. The system may later use the list of possible failures to pick up a most likely failure based on resolution index, cost and access privilege, as represented in block 680. When the customer calls up to report a fault, the customer support operations support agent would be presented with one troubleshooting step (probable failure) at a time based on the information populated by the scenario developer and historic information. Thus, the system may guide the customer support operations in real-time when troubleshooting a fault or failure.

In one embodiment of the present technique, the use of knowledge model may reduce the use of explicit knowledge definition and rationale. The dependency of the experts to maintain the knowledge would be less. Faster rolling of new services due to reliance on vendors to provide service specific failures and diagnostics information. The knowledge model may be extended for multiple flavors of service offering without any hard coding. For example, the CSP supporting video delivery through ATM network in region east and through IP network in region west may have different diagnostics based on the specific network architecture without any hard coding flow charts.

In another embodiment of the present technique, the model based approach may enable the CSP to deal with a reduced set of issues on the basis of a prior model of service or product. The prior model may significantly reduce the ration between "worked-on" problems to "customer-reported" problems reported, while yet delivering a superior customer experience.

In yet another embodiment of the present technique, the advantage of building the knowledge model or the information model may help to explicitly capture knowledge definition and there is minimal dependency on the expert to make enhancement or changes in the diagnostics. Another advantage may be a reusability of model across various CSP implementations.

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

Exemplary Computing Environment

One or more of the above-described techniques can be implemented in or involve one or more computer systems.

Figure 7:
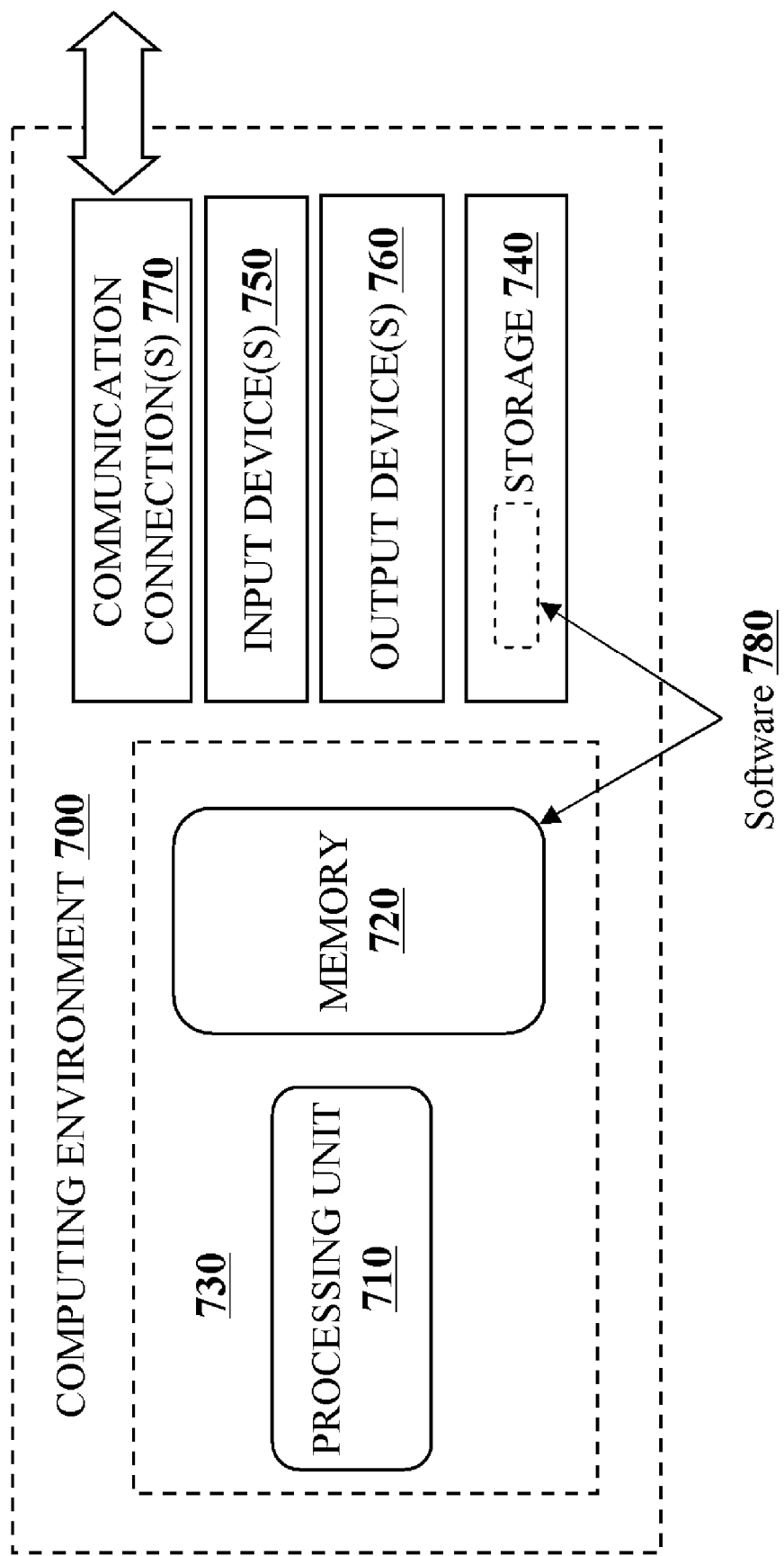
FIG. 7 is a system illustrating a generalized computer network arrangement, in one embodiment of the present technique.

FIG. 7 illustrates a generalized example of a computing environment 700. The computing environment 700 is not intended to suggest any limitation as to scope of use or functionality of described embodiments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. In some embodiments, the memory 720 stores software 780 implementing described techniques.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. In some embodiments, the storage 740 stores instructions for the software 780.

The input device(s) 750 may be a touch input device such as a keyboard, mouse, pen, trackball, touch screen, or game controller, a voice input device, a scanning device, a digital camera, or another device that provides input to the computing environment 700. The output device(s) 760 may be a display, printer, speaker, or another device that provides output from the computing environment 700.

The communication connection(s) 770 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 700, computer-readable media include memory 720, storage 740, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of performing at least one diagnostic test in an integrated support platform having a plurality of services, the method comprising:
building at least one or more knowledge model for respective of the plurality of services in the integrated support platform by determining one or more components related to the plurality of services, wherein building the at least one knowledge model comprises:
determining one or more possible failures of respective components of the one or more components and at least one associated symptom to identify the one or more possible failures;
constructing a framework for one or more diagnostics, that are associated to the one or more possible failures by creating at least one execution plan based on a most efficient path for determining a possible failure of the one or more possible failures, wherein the most efficient path for determining the possible failure of the one or more possible failures comprises a route defined though a process that comprises computing a historical result for a specific problem and associated diagnostics of the one or more of the diagnostics associated with the specific problem to determine a most used of the associated diagnostics of the one or more diagnostics for resolving the possible failure, wherein the most used of the associated diagnostics of the one or more diagnostics is prioritized based on a resolution index assigned to the most used of the associated diagnostics of the one or more diagnostics; and
performing the at least one diagnostic test resolving one or more failures of respective components by using the framework based on the built knowledge model for the plurality of services.

2. The method of claim 1, wherein the integrated support platform includes at least one of a customer support platform or a network support platform or both.

3. The method as recited in claim 2, wherein the customer support platform includes at least one of a trouble ticketing or a self care or a help desk or a customer relationship management (CRM) or combinations thereof.

4. The method as recited in claim 2, wherein the network support platform includes at least one of a network monitoring or an alarm collection and correlation or a network trouble reporting or a network performance monitoring or combinations thereof.

5. The method of claim 1, wherein the plurality of services includes at least one of a Digital Subscriber Line (DSL) service or a broadband service or an Internet Protocol (IP) TV service or a Voice over IP (VoIP) service or a wireless service or a cable service or an Internet Protocol (IP) Multimedia Subsystem (IMS) or combinations thereof.

6. The method of claim 1, wherein performing the diagnostics in the integrated support platform further includes a plurality of products for each of the plurality of services.

7. The method of claim 1, wherein the execution plan includes at least one of a trouble shooting workflow or a customer symptom validation or a resource state validation or combinations thereof.

8. The method of claim 1, wherein the one or more failures include at least one of a resource failure or a service failure or both.

9. The method of claim 8, wherein the service failures is identified based on a scenario describing a specific service feature used by the customer.

10. The method as recited in claim 8, wherein the resource failures from a network is correlated to the service failures of the customer, wherein correlation between the service failures and the resource failures includes one or more problems sensed from the customer in form of the plurality of symptoms.

11. The method of claim 1, wherein the diagnostics for resolving one or more failures using the knowledge model for the plurality of problems sensed from the customer are arranged optimally for resolving the failures.

12. The method of claim 1, wherein determining at least one or more possible failures of each component to build the knowledge model includes at least one of the failures derived from knowledge of one or more experts in a domain or from an actual failures captured earlier in the similar services or both.

13. The method of claim 1, further comprising the framework for associating at least one symptom to identify one or more possible failures includes knowledge derived out of at least one or more experts in a domain.

14. The method of claim 1, wherein the most efficient path for determining the possible failure of the one or more possible failures further includes at least one of a route defined from the expert(s) in the domain or through a process of continuous learning or combinations thereof.

15. The method as recited in claim 14, wherein the process of continuous learning includes at least one of knowledge captured about failures from the experts in the domain or from the experience of resolving the similar problems by a customer support representative (CSR) or from a prior use of similar diagnostics by the CSR in resolving the problem or combinations thereof.

16. The method as recited in claim 14, wherein the process of continuous learning further includes determining situational information of the network including at least one of a planned engineering maintenance work or a network migration or an early service failure about a new service rolled in the market or combinations thereof.

17. The method as recited in claim 14, wherein the process of determining the most efficient path further includes determining a state of at least one of the products or the services or both.

18. The method as recited in claim 14, wherein the historical results are used to identify the associated diagnostics of the one or more diagnostics for resolving failures sensed from the customer based on resolution indexes assigned for respective of the associated diagnostics of the one or more diagnostics.

19. The method as recited in claim 14, wherein the process of continuous learning further includes determining at least one of a cost of performing the diagnostics or an impact of the diagnostics on the network or a need for the diagnostics to interact with a manual process or an access privilege for performing the diagnostics or combinations thereof.

20. The method of claim 1, wherein constructing the framework for the diagnostics includes associating the resource failures of the network with the associated symptoms.

21. The method of claim 1, wherein determining at least one or more resource failures of each physical component related to the logical component and the associated symptoms to identify the resource failures is captured in the knowledge model.

22. The method of claim 1, further comprising enhancing the context of a ticket for the problem escalated from at least one of the customer or the network support platform or both using an information model, wherein the information model includes information gathered from a plurality of application source, wherein the plurality of application source comprises at least one of a customer relationship management (CRM) or a network inventory or an engineering application or a fault management or a performance management or a Service Level Agreement (SLA) management or a trouble management or combinations thereof.

23. A system for building a knowledge model to perform diagnostics for a plurality of services, the system comprising:
one or more components configured for building the knowledge model related to respective of the plurality of services;
a framework configured for the plurality of components associated to the respective of the plurality of services, to perform the diagnostics, wherein the framework comprising:
a failure module including at least one or more possible failures for each of the plurality of components;
a problem module including at least one or more problems associated to respective of the possible failures of the at least one or more possible failures;
a symptom module including at least one symptoms associated to each problems; and
a diagnostics module including at least one or more diagnostics to run for localizing each of one or more problems, wherein the diagnostics module is used to determine at least one execution plan comprising at least one route determined at least based on computing a historical result at least for a specific problem and associated diagnostics of the one or more diagnostics to determine a most used of the associated diagnostics of the one or more diagnostics for resolving a possible failure of the at least one or more possible failures, wherein the most used of the associated diagnostics of the one or more diagnostics is prioritized based on a resolution index assigned to the most used of the associated diagnostics of the one or more diagnostics.

24. The system as recited in claim 23, wherein the components of the knowledge model includes at least one of a logical component or a physical component or both.

25. The system as recited in claim 23, wherein the failure module further includes at least one of a service failure module or a resource failure module or combinations thereof.

26. The system of claim 25, wherein the each of the plurality of failures in the logical component is associated to respective failures in the physical component.

27. The system of claim 23, further comprising a scenario module including at least one or more scenario associated to the problems.

28. A computer program product comprising a computer readable storage media having a computer readable program code embodied therein, the computer readable program code causing a computer to perform a method for performing diagnostics in an integrated support platform having a plurality of services, the method comprising:
program code adapted for building at least one knowledge model for each of the plurality of services in the integrated support platform, by determining one or more components related to the plurality of services, wherein program code adapted for building the at least one knowledge model comprising;

program code adapted for determining one or more failures of each component and at least one associated symptom to identify the one or more failures;

program code adapted for constructing a framework for the diagnostics associated to the one or more failures, by creating at least one execution plan based on a most efficient path for determining the one or more failures, wherein the most efficient path for determining the one or more failures comprises a route defined through a process of continuous learning, the process of continuous learning comprising:

- determining a cost of performing one or more of the diagnostics associated to the one or more failures;
- determining an access privilege for performing the one more of the diagnostics; and
- computing a historical result for a specific problem and associated diagnostics of the one or more of the diagnostics associated to the one or more failures at periodic intervals to determine a most used of the one or more associated diagnostics of the one or more of the diagnostics, wherein the historical result is used to identify and prioritize the one or more diagnostics associated to the one or more failures based on resolution indexes assigned to respective of the associated diagnostics of the one or more diagnostics, wherein a resolution index of the resolution indexes is assigned to the most used of the one or more associated diagnostics, the resolution index of the one or more resolution indexes is incremented based on use of the most used of the one or more associated diagnostics, the most used of the one or more associated diagnostics having the highest resolution index of the resolution indexes; and program code adapted for performing the diagnostics for resolving one or more failures of each components by using the framework based on the built knowledge model for the plurality of services.

* * * * *

UNITED STATES PATENT AND TRADEMARK OFFICE
CERTIFICATE OF CORRECTION

PATENT NO.         : 8,086,897 B2                                   Page 1 of 4
APPLICATION NO.    : 12/269576
DATED              : December 27, 2011
INVENTOR(S)        : Pramidi et al.

It is certified that error appears in the above-identified patent and that said Letters Patent is hereby corrected as shown below:

In the Figures

FIG. 3, box 330, line 2, "a customers" should read --a customer--;
FIG. 4, box 410, line 1, "failure's" should read --failures--;
FIG. 5, box 510, line 2, "customer experiencing" should read --customer is experiencing--;
FIG. 5, "320" should read --330--;

In the Specification

Col. 1, line 19, "problem" should read --problems--;
Col. 1, line 20, "problem" should read --problems--;
Col. 1, line 28, "technicians performs" should read --technician performs--;
Col. 1, line 45, "lot of" should read --a lot of--;
Col. 1, line 46, "lot of" should read --a lot of--;
Col. 1, line 47, "involves" should read --involve--;
Col. 1, line 52, "does not" should read --do not--;
Col. 1, line 53, "needs to" should read --need to--;
Col. 1, line 55, "a very" should read --very--;
Col. 2, line 28, "symptoms" should read --symptom--;
Col. 2, line 43, "source" should read --sources--;
Col. 2, line 45, "a engineering" should read --an engineering--;
Col. 2, line 51, "referred as" should read --referred to as--;
Col. 2, line 53, "("herein" should read --(herein--;
Col. 2, lines 53-54, "referred as" should read --referred to as--;
Col. 2, line 54, "in much" should read --in a much--;
Col. 2, line 58, "a costs" should read --costs--;
Col. 2, line 58, "a planned" should read --planned--;
Col. 2, line 59, "a network" should read --network--;
Col. 2, line 59, "an early" should read --early--;

Signed and Sealed this
Thirteenth Day of November, 2012

David J. Kappos
*Director of the United States Patent and Trademark Office*

CERTIFICATE OF CORRECTION (continued)

U.S. Pat. No. 8,086,897 B2

Col. 2, lines 60-61, "a network" should read --network--;
Col. 2, line 61, "a performance" should read --performance--;
Col. 2, line 61, "a trouble" should read --trouble--;
Col. 2, line 66, "as well other" should read --as well as other--;
Col. 3, line 7, "a diagnostics" should read --diagnostics--;
Col. 3, line 17, "a diagnostics" should read --diagnostics--;
Col. 3, line 20, "a diagnostics" should read --diagnostics--;
Col. 3, line 24, "a diagnostics" should read --diagnostics--;
Col. 3, line 28, "a diagnostics" should read --diagnostics--;
Col. 3, line 37, "is full" should read --is a full--;
Col. 3, lines 55-60, "a diagnostics" should read --diagnostics--;
Col. 4, line 4, "cope" should read --scope--;
Col. 4, lines 7-8, "a diagnostics" should read --diagnostics--;
Col. 4, line 14, "and few" should read --and a few--;
Col. 4, line 15, "a diagnostics" should read --diagnostics--;
Col. 4, line 17, "includes" should read --include--;
Col. 4, line 21, "includes" should read --include--;
Col. 4, line 25, "a identifying" should read --an identifying--;
Col. 4, line 27, "fixed by module 195" should read --fixed by module 190--;
Col. 4, line 40, "each services or products" should read --each service or product--;
Col. 5, line 2, "RFS physical resource 130" should read --RFS physical implementation 120--;
Col. 5, line 15, "a expert" should read --an expert--;
Col. 5, line 35, "list of" should read --a list of--;
Col. 5, line 37, "domain, the" should read --domain that the--;
Col. 5, lines 42-43, "scenario module 145" should read --scenario module 140--;
Col. 5, line 46, "list of" should read --a list of--;
Col. 5, lines 48-49, "occurred either occurred in" should read --occurred either in--;
Col. 6, line 1, "resource module" should read --resource failure module--;
Col. 6, line 13, "The attribute module 170 may comprise" should read --the attribute module may comprise--;
Col. 6, line 19, "value module 175 may include" should read --value module may include--;
Col. 6, line 35, "test module" should read --test results module--;
Col. 6, line 40, "list of" should read --a list of--;
Col. 6, line 50, "diagram the" should read --diagram of the--;
Col. 6, line 67, "a diagnostics" should read --diagnostics--;
Col. 7, line 3, "with in" should read --within--;
Col. 7, line 21, "list of" should read --a list of--;
Col. 7, line 25, "list of" should read --a list of--;
Col. 7, lines 31-32, "each of the customer." should read --each customer.--;
Col. 7, line 41, "imply" should read --apply--;
Col. 7, line 51, "is activated" should read --activated--;
Col. 7, lines 60-61, "before hand" should read --beforehand--;
Col. 7, line 65, "diagnostics. As" should read --diagnostics, as--;

CERTIFICATE OF CORRECTION (continued)

U.S. Pat. No. 8,086,897 B2

Col. 8, line 1, "a network details" should read --network details--;
Col. 8, line 17, "be few" should read --be a few--;
Col. 8, line 37, "gets" should read --are--;
Col. 8, line 45, "a diagnostics" should read --diagnostics--;
Col. 8, line 48, "(block 301)" should read --(block 310)--;
Col. 8, line 50, "(block 302)" should read --(block 320)--;
Col. 8, line 52, "a customers" should read --a customer--;
Col. 8, line 52, "(block 303)" should read --(block 330)--;
Col. 8, line 55, "step 301" should read --step 310--;
Col. 8, line 66, "a diagnostics" should read --diagnostics--;
Col. 9, line 3, "(block 310)" should read --(block 320)--;
Col. 9, line 4, "failure's" should read --failures--;
Col. 9, line 4, "determine" should read --determining--;
Col. 9, line 18, "product. Followed" should read --product, followed--;
Col. 9, line 21, "services" should read --service--;
Col. 9, line 23, "failure" should read --failures--;
Col. 9, line 25, "from plurality" should read --from a plurality--;
Col. 9, line 26, "on the each determined failures" should read --on each determined failure--;
Col. 9, line 27, "captures" should read --capture--;
Col. 9, line 30, "symptoms'" should read --symptoms--;
Col. 9, line 30, "identity" should read --identify--;
Col. 9, line 33, "mapped a" should read --mapped, a--;
Col. 9, line 33, "a diagnostics" should read --diagnostics--;
Col. 9, line 34, "constructed, in step" should read --constructed in step--;
Col. 9, line 42, "a diagnostics" should read --diagnostics--;
Col. 9, lines 46-47, "customer experiencing" should read --customer is experiencing--;
Col. 9, line 49, "identify" should read --identifying--;
Col. 9, line 51, "fetch" should read --fetching--;
Col. 10, line 11, "in form of" should read --in the form of--;
Col. 10, line 35, "includes" should read --include--;
Col. 10, line 49, "is" should read --are--;
Col. 10, line 53, "plan" should read --plans--;
Col. 10, line 56, "then" should read --and then--;
Col. 10, line 56, "with in" should read --within--;
Col. 10, line 63, "in by" should read --in--;
Col. 10, line 64, "source" should read --sources--;
Col. 11, line 25, "a diagnostics" should read --diagnostics--;
Col. 11, line 42, "a logical resources" should read --logical resources--;
Col. 11, line 50, "& or" should read --and/or--;
Col. 11, line 58, "includes" should read --including--;
Col. 12, line 1, "E.g. A xDSL" should read --For example, a xDSL--;
Col. 12, line 17, "are may" should read --may--;
Col. 12, line 21, "there of" should read --thereof--;
Col. 12, line 47, "ration" should read --ratio--;

In the Claims

Col. 14, line 32, "though" should read --through--;
Col. 15, line 8, "failures is" should read --failures are--;
Col. 15, line 12, "is" should read --are--;
Col. 15, line 15, "in form" should read --in a form--;
Col. 15, line 25, "failures" should read --failure--;
Col. 16, lines 10-11, "application source," should read --application sources,--;
Col. 16, line 11, "plurality of application source" should read --plurality of application sources--;
Col. 16, lines 24-25, "comprising:" should read --comprises:--;
Col. 16, line 31, "one symptoms" should read --one symptom--;
Col. 16, line 32, "each problems" should read --each problem--;
Col. 16, line 49, "includes" should read --include--;
Col. 16, line 58, "scenario" should read --scenarios--;
Col. 16, line 61, "media" should read --medium--;
Col. 17, line 4, "comprising;" should read --comprises:--;
Col. 17, line 19, "one more of" should read --one or more of--;
Col. 18, line 18, "each components" should read --each component--.